Jan. 30, 1934.    M. P. YOUKER    1,945,249

APPARATUS FOR FILTERING PETROLEUM VAPORS

Filed Jan. 11, 1929

INVENTOR
M. P. YOUKER
BY
Robt. E. Barry
ATTORNEY

Patented Jan. 30, 1934

1,945,249

UNITED STATES PATENT OFFICE 1,945,249

APPARATUS FOR FILTERING PETROLEUM VAPORS

Malcolm P. Youker, Tulsa, Okla., assignor, by mesne assignments, to The Gray Processes Corporation, Newark, N. J., a corporation of Delaware Application January 11, 1929. Serial No. 331,816

1 Claim. (Cl. 196—96)

My invention relates to the vapor phase treating of hydrocarbon vapors and has special reference to a process and apparatus which are adapted to the filtering of cracked gasoline vapors through agents having catalytic properties similar to that of fuller's earth, while such vapors are in a heated condition.

An object of my invention is to provide a process and apparatus by which petroleum vapors may be subjected to polymerization and subsequently centrifugally separated from polymers which are formed in part of the apparatus. This advantage and likewise other advantages which will become apparent, are attained by my new apparatus.

My improvements will be understood from the following specification, taken in connection with the accompanying drawing, in which.

Figure 2:
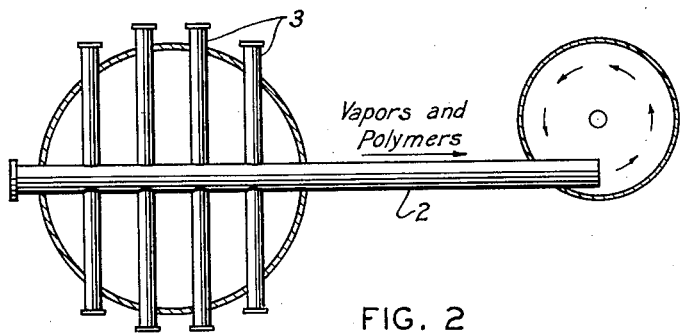
Fig. 2 is a cross section of the apparatus.
Figure 1:
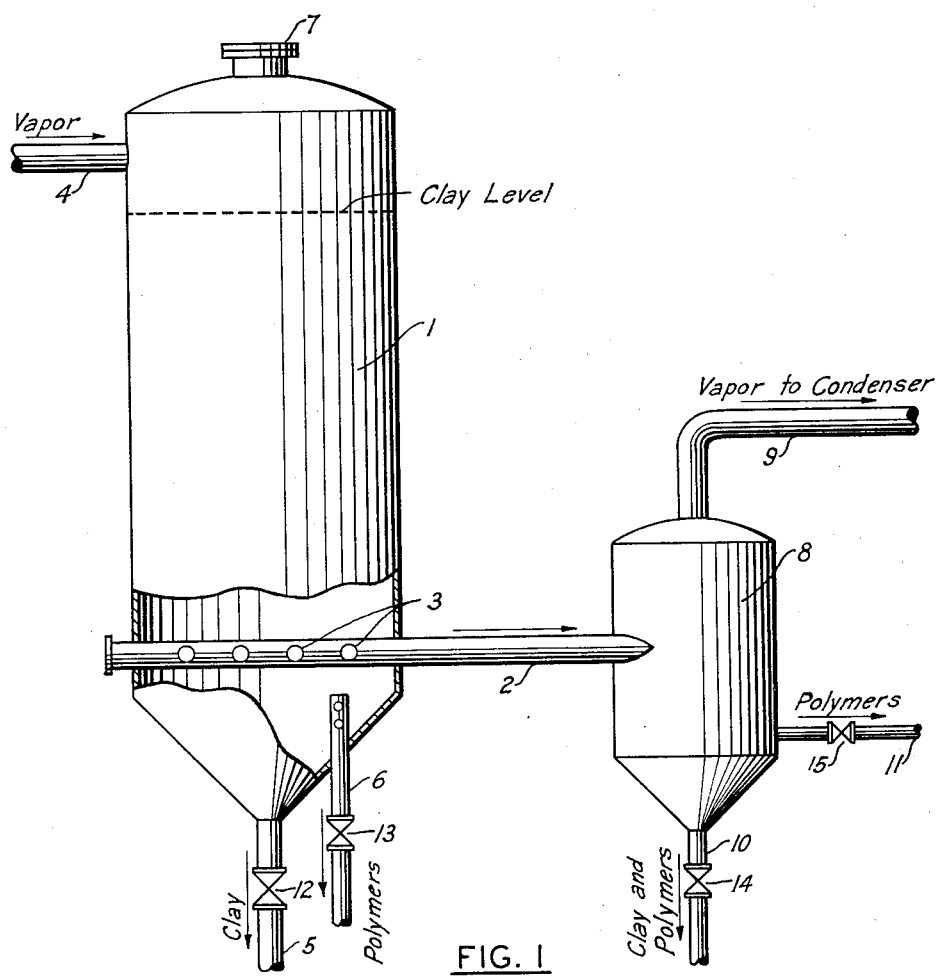
Fig. 1 illustrates my new apparatus in side elevation.

Referring to the drawing, the numeral 1 designates a vertical cylindrical condenser which has a cone bottom, and which is suitably supported. A vapor collector, which is made up of a pipe 2 and lateral branches 3, is disposed in a horizontal plane inside and near the bottom of the vessel 1. Branches 3 connect at their inner ends with the pipe 2, and their extremities, which extend outside of the shell of vessel 1, are provided with removable caps. Those parts of the lower halves of the branches 3, which are inside the shell of vessel 1, are perforated, and the parts of the branches which are inside the shell of the vessel 1, are covered with a fine screen which is suitable for the prevention of the flow of fuller's earth or the like, through the perforations in these pipes.

A pipe 4 leads into the top of vessel 1, and a pipe 5 leads from the bottom of the vessel 1. A pipe 6, which extends into the bottom of vessel 1, leads from said vessel. That part of pipe 6, which extends into vessel 1, is perforated and covered with screen suitable to prevent the flow of fuller's earth or other suitable filtering agent. A covered manhole 7 is mounted on the top of vessel 1. The pipe 2 extends through the vessel 1. One end of pipe 2 is provided with a removable cap, while its other end projects into a vertical cylindrical vessel or centrifugal separator 8 in a position immediately adjacent to and tangential to the shell of vessel 8.

A pipe 9 leads from the top of vessel 8, and a pipe 10 leads from the bottom of said vessel. A pipe 11 leads from the side of vessel 8 at a point below the point of entry of pipe 2, into this vessel. Valves 12, 13, 14 and 15 are mounted in pipes 5, 6, 10 and 11 respectively.

This apparatus is operated in the following described manner:

Valves 12, 13, 14 and 15 are closed and the vessel 1 is filled with fuller's earth or any other suitable agent having similar catalytic properties, to a level slightly below the point of entry of pipe 4 into vessel 1. Manhole 7 is closed. Petroleum vapor, which is to be treated, is caused to flow through pipe 4 into vessel 1, and thence downward through the fuller's earth or the like, in vessel 1, and thence through the perforations into pipes 3, and thence through pipes 3 and pipe 2, into vessel 8. Some of the polymers which are formed in vessel 1, collect in its bottom and are withdrawn therefrom by manipulation of valve 13, through the pipe 6. Some of the polymers which are formed in the vessel 1 are in the form of a fine mist in the vapor leaving the vessel through pipe 2. The vapor which leaves tank 1 and flows through pipe 2 into vessel 8, enters the latter with considerable velocity, and due to the fact that the pipe 2 enters vessel 8 in a position immediately adjacent to and tangential to the shell of vessel 8, these vapors rotate rapidly within this vessel. The rapid rotation of the vapors causes polymers, which are contained in these vapors in the form of a fine mist, to be thrown to the side of vessel 8. These polymers then collect in the bottom of vessel 8, while vapors leave the vessel through pipe 9, and flow thence to a condenser (not shown). Polymers which collect in vessel 8 are, through manipulation of valve 15, withdrawn through pipe 11. Fuller's earth or the like, which sometimes leaks through the screens with which the perforations in pipes 3 are covered, flows through pipe 2 into the vessel 8, and is separated from the vapors and is withdrawn by way of pipe 10, through manipulation of valve 14.

From the above description it will be seen that the vessel 8 serves as a centrifugal separator to separate from the vapor, which has been subjected to a polymerization action in vessel 1, any polymers, fuller's earth or the like, which may be contained therein.

When the fuller's earth or the like has become so contaminated it can no longer be used, it may be withdrawn from the vessel 1, through the pipe 5.

I am aware that various changes may be made in the details disclosed, without departing from the spirit of the invention, as expressed in the claim.

What I claim and desire to secure by Letters Patent is:

A petroleum vapor treating apparatus comprising a vessel substantially filled with solid adsorptive material, a vapor inlet pipe, a vapor outlet pipe, perforated lateral branches extending from the vapor outlet pipe and being embedded in the solid adsorptive material, means for preventing influx of the solid adsorptive material into said branches, a chamber having a cylindrical inner surface, the discharge end of the vapor outlet pipe opening tangentially into said chamber, a vapor outlet pipe for said chamber, and a liquid outlet pipe for said chamber.

MALCOLM P. YOUKER.